United States Patent
Jung et al.

(10) Patent No.: US 8,402,113 B2
(45) Date of Patent: Mar. 19, 2013

(54) SEMANTIC SERVICE APPLYING SYSTEM AND METHOD

(75) Inventors: Han Min Jung, Daejeon (KR); Pyung Kim, Daejeon (KR); Seung Woo Lee, Daejeon (KR); Mi Kyung Lee, Daejeon (KR); Beom Jong You, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 0 days.

(21) Appl. No.: 13/319,119

(22) PCT Filed: Jul. 10, 2009

(86) PCT No.: PCT/KR2009/003804
§ 371 (c)(1),
(2), (4) Date: Nov. 7, 2011

(87) PCT Pub. No.: WO2010/128710
PCT Pub. Date: Nov. 11, 2010

(65) Prior Publication Data
US 2012/0059908 A1    Mar. 8, 2012

(30) Foreign Application Priority Data
May 7, 2009   (KR) ................... 10-2009-0039773

(51) Int. Cl.
*G06F 15/173* (2006.01)
(52) U.S. Cl. .............................................. 709/217
(58) Field of Classification Search ............ 709/217
See application file for complete search history.

(56) References Cited

U.S. PATENT DOCUMENTS

| | | | |
|---|---|---|---|
| 7,756,890 B2* | 7/2010 | Carter ........................ | 707/776 |
| 7,908,278 B2* | 3/2011 | Akkiraju et al. ............. | 707/748 |
| 7,933,764 B2* | 4/2011 | Kang et al. .................. | 704/8 |
| 7,987,163 B2* | 7/2011 | Keshavarz-Nia et al. ..... | 707/694 |
| 8,065,336 B2* | 11/2011 | Armstrong et al. ........... | 707/794 |
| 8,117,280 B2* | 2/2012 | Masuouka et al. ........... | 709/218 |
| 8,266,297 B2* | 9/2012 | Li et al. ...................... | 709/227 |

(Continued)

FOREIGN PATENT DOCUMENTS

| EP | 1675022 A1 | 6/2006 |
|---|---|---|
| KR | 10-2008-0100931 A | 11/2008 |

(Continued)

OTHER PUBLICATIONS

Semantic Enhancement Engine: A Modular Document Enhancement Platform for Semantic Application over Heterogenous, V. Kashyap et.al. ISO Press, ISBN 1-58603-306-9, pp. 29-49 Dec. 2002.*

(Continued)

*Primary Examiner* — David Eng
(74) *Attorney, Agent, or Firm* — LRK Patent Law Firm

(57) ABSTRACT

The present invention relates to a semantic service applying system and a method, comprising: a semantic service pipeline manager which demands and receives a particular semantic service pipeline to and from a semantic service server, and stores the corresponding pipeline in a database to manage the stored pipeline; a semantic service pipeline provider which extracts corresponding semantic service pipelines and sends the extracted pipelines to the corresponding service server if the user requests at least one of a plurality of semantic service pipelines to be provided; and a database which stores information associated with a semantic service pipeline providing server as well as the semantic service pipelines, and thus various ontology-based semantic services can be applied to the web.

13 Claims, 3 Drawing Sheets

U.S. PATENT DOCUMENTS 8,296,297 B2 * 10/2012 Green et al. .................. 707/736
8,301,622 B2 * 10/2012 Green et al. .................. 707/722
2006/0161655 A1 7/2006 Altenhofen et al.

FOREIGN PATENT DOCUMENTS

KR 10-2009-0001173 A 1/2009

OTHER PUBLICATIONS

Sycara K, "Dynamic Discovery, Invocation and Composition of Semantic Web Services", Methods and Applications of Artificial Intelligence. Hellenicconference on AI, SETN. Proceedings, Springer Verlag, Berlin, DE, Jan. 1, 2004, pp. 3-12, XP002321828.

Paar A et al., "Semantic Software Engineering Approaches for Automatic Service Lookup and Integration", Automatic Computing Workshop. 2003. Proceedings of the Jun. 25, 2003, Piscataway, NJ, USA, IEEE, Jan. 1, 2003, pp. 108-115, XP010644231, ISBN: 978-0-7695-1983-8.

European Search Report for Application No. 09844377.3 which corresponds to the above-identified application, Jan. 10, 2012.

International Search Report for International Application No. PCT/KR2009/003804, Jul. 10, 2009.

KIPO Office Action for Korean Patent Application No. 10-2009-0039773, Sep. 5, 2011.

* cited by examiner

SEMANTIC SERVICE APPLYING SYSTEM AND METHOD

TECHNICAL FIELD

The present invention relates to a semantic service application system and method and, more particularly, to a semantic service application system and method for selecting, collecting, and managing a semantic service pipeline in which semantic services distributed among a plurality of service servers are combined and for applying the semantic service pipeline to a web frame or a web page.

BACKGROUND ART

Web service is a method of providing service using a standard protocol on the web and is commonly used when web applications are constructed. A search Application Programming Interface (API) or an API executing a specific command widely adopts the web service method.

With the development of the Internet, APIs adopting web service are increased, and services using the API are further increased.

Accordingly, the creation of new services through web service combinations is emerging as an important issue. This is because services created through the web service combinations have great costs versus effects as compared with services newly constructed.

A task of finding a proper combination based on web services where a web service combination is described in a syntactic way becomes static, or the task has limitation to dependency on a manual task.

In order to overcome this, there has recently been made an attempt to access a web service description, such as OWL-S, in a semantic way using OWL through standardization organizations, such as W3C.

There is, however, also a limit to the attempt. This is because the subject of the description itself is not semantic service, but common web service.

In other words, there is not proposed a method of intelligently attempting a web service combination because semantic service providing a search API or a reasoning API based on ontology is not taken into consideration.

Consequently, there is an urgent need for technical support for creating new semantic service through a combination of ontology-based semantic services that are expected to abruptly increase in the future, but there is no method of supporting the urgent need using the prior art.

DISCLOSURE

Technical Problem

The present invention has been made in view of the above problems occurring in the prior art, and an object of the present invention is to provide a semantic service application system and method for generating semantic service pipelines in which ontology-based semantic services distributed among service servers are combined, for selecting, collecting, and managing a specific semantic service pipeline from among the generated semantic service pipelines, and for applying the specific semantic service pipeline to a web frame or a web page.

Another object of the present invention is to change a factor of a semantic service pipeline so that the semantic service pipeline is suitable for the subject to which the semantic service pipeline will be applied.

Technical Solution

To achieve the above objects, a semantic service application system of the present invention comprises a semantic service server for collecting pieces of ontology-based semantic service information and ontology from a plurality of service servers, registering the pieces of ontology-based semantic service information and ontology, generating semantic service pipelines based on a plurality of semantic services according to a condition inputted by a user, and executing a specific semantic service pipeline;

a semantic service pipeline providing server for requesting the semantic service server to execute the specific semantic service pipeline, receiving a result of the execution, determining whether to select the specific semantic service pipeline, receiving the specific semantic service pipeline by requesting the specific semantic service pipeline from the semantic service server if the specific semantic service pipeline is determined to be selected, and storing the specific semantic service pipeline; and the service server for receiving a specific semantic service pipeline by requesting the specific semantic service pipeline from the semantic service pipeline providing server and incorporating the receive semantic service pipeline into its specific web frame or web page.

The semantic service pipeline providing server comprises:

a semantic service pipeline management unit for receiving the specific semantic service pipeline by requesting the specific semantic service pipeline from the semantic service server, storing the received semantic service pipeline in a database, and managing the stored semantic service pipeline;

a semantic service pipeline providing unit for, when the user requests one or more of a plurality of the semantic service pipelines to be provided, extracting the relevant semantic service pipelines from the database, and transmitting the relevant semantic service pipelines to a relevant service server; and the database for storing information associated with the semantic service pipeline providing server, including the semantic service pipelines.

The semantic service pipeline providing server further comprises a semantic service pipeline selection unit for selecting the specific semantic service pipeline to be managed by the semantic service pipeline providing server, from among the plurality of semantic service pipelines provided on the semantic service server.

It is preferred that the semantic service pipeline selection unit request the specific semantic service pipeline, from among the plurality of semantic service pipelines provided on the semantic service server, to be executed and determine whether to select the specific semantic service pipeline based on the result of the execution received from the semantic service server.

It is preferred that the semantic service pipeline selection unit request a change of a factor and an execution of the specific semantic service pipeline, from among the plurality of semantic service pipelines provided on the semantic service server, and determine whether to select the specific semantic service pipeline based on the result of the execution received from the semantic service server.

It is preferred that the database
store the semantic service pipeline in a script language form.

According to another aspect of the present invention provides a semantic service pipeline providing server coupled to a semantic service server and a plurality of service servers over a communication network and configured to provide semantic service pipelines, the semantic service pipeline providing server comprising:

a semantic service pipeline management unit for receiving a specific semantic service pipeline by requesting the specific semantic service pipeline from the semantic service server, storing the received semantic service pipeline in a database, and managing the stored semantic service pipeline;

a semantic service pipeline providing unit for, when a user requests one or more of a plurality of the semantic service pipelines to be provided, extracting the relevant semantic service pipelines from the database, and transmitting the relevant semantic service pipelines to a relevant service server; and the database for storing information associated with the semantic service pipeline providing server, including the semantic service pipelines.

It is preferred that the semantic service pipeline providing server
further comprise a semantic service pipeline selection unit for selecting the specific semantic service pipeline to be managed by the semantic service pipeline providing server, from among the plurality of semantic service pipelines provided on the semantic service server.

It is preferred that the semantic service pipeline selection unit
request the specific semantic service pipeline, from among the plurality of semantic service pipelines provided on the semantic service server, to be executed and determine whether to select the specific semantic service pipeline based on a result of the execution received from the semantic service server.

It is preferred that the semantic service pipeline selection unit
request a change of a factor and an execution of the specific semantic service pipeline, from among the plurality of semantic service pipelines provided on the semantic service server, and determine whether to select the specific semantic service pipeline based on the result of the execution received from the semantic service server.

It is preferred that the database
store the semantic service pipelines in a script language form.

Yet another aspect of the present invention provides a semantic service application method of a semantic service application system, including a semantic service server, a semantic service pipeline providing server, and service servers, providing semantic services, the semantic service application method comprising the steps of:

a) the semantic service server collecting pieces of ontology-based semantic services and ontology distributed among a plurality of the service servers, registering the pieces of ontology-based semantic services and ontology, and generating semantic pipelines by combining one or more of the semantic services according to a specific condition;

b) the semantic service pipeline providing server requesting a specific semantic service pipeline, from among a plurality of semantic service pipelines provided on the semantic service server, to be executed and checking a result of the execution;

c) the semantic service pipeline providing server receiving the executed semantic service pipeline by requesting the executed semantic service pipeline and storing the received semantic service pipeline; and d) the service server receiving a specific semantic service pipeline by requesting the specific semantic service pipeline from the semantic service pipeline providing server and applying the received semantic service pipeline to its web frame or web page.

It is preferred that before the step c) after the step b),
the semantic service application method further comprise the step of selecting the specific semantic service pipeline to be managed by the semantic service pipeline providing server based on the result of the execution of the specific semantic service pipeline.

It is preferred that before the step c) after the step b),
the semantic service application method further comprise the steps of the semantic service pipeline providing server checking the result of the execution and requesting a change of a factor and an execution of the specific semantic service pipeline;

the semantic service server incorporating the factor, requested to be changed by the semantic service pipeline providing server, into the specific semantic service pipeline, executing the specific semantic service pipeline, and transmitting a result of the execution to the semantic service pipeline providing server; and the semantic service pipeline providing server selecting the specific semantic service pipeline to be managed by the semantic service pipeline providing server based on the result of the execution of the specific semantic service pipeline.

It is preferred that at the step c),
the semantic service pipeline be stored in a script language form.

Advantageous Effects

As described above, the semantic service application system and method of the present invention generate semantic service pipelines in which ontology-based semantic services distributed among service servers are combined, select, collect, and manage a specific semantic service pipeline from among the generated semantic service pipelines, and apply the specific semantic service pipeline to a web frame or a web page. Accordingly, an effect that a variety of ontology-based semantic services can be applied to the web can be expected.

Furthermore, the present invention has effects that a factor of a semantic service pipeline can be changed so that the semantic service pipeline is suitable for the subject to which the semantic service pipeline will be applied and the semantic service pipeline can be actually applied to service embodiments.

DESCRIPTION OF REFERENCE NUMERALS OF PRINCIPAL ELEMENTS IN THE DRAWINGS

Figure 1:
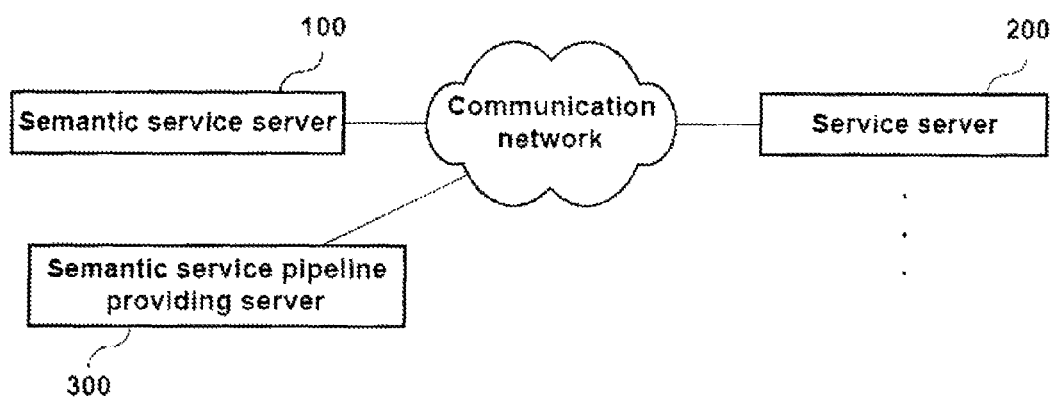
FIG. 1 is a diagram showing the construction of a semantic service application system according to the present invention.

100: semantic service server 110: semantic service management unit
130: semantic broker 150: semantic service license unit
200: service server
300: semantic service pipeline providing server
310: semantic service pipeline selection unit
330: semantic service pipeline management unit
350: semantic service pipeline providing unit
370: database

MODE FOR INVENTION

Preferred embodiments of the present invention are described in detail with reference to the accompanying drawings.

Semantic service disclosed in the present invention is defined as service in which ontology information is used as an input factor (parameter) and an output factor and the ontology information is utilized for providing service.

Here, the ontology information of the input factor is essential, and the ontology information of the output factor is optional. Furthermore, a search API includes the ontology information in the input factor, but does not utilize the output factor or the ontology information.

Meanwhile, not the ontology, but a common API may also be used as the input factor and the output factor according to the necessity of an operator.

For example, ontology-based semantic services use semantic information in the input factor and output results. In case of semantic service that finds experts for specific research subjects, a Uniform Resource Identifier (URI) that is an ontology standard identification system is used as the input factor, and identifiers are provided as the output results using the URI.

Here, ontology is a specification that is explicitly standardized in order to provide a concept for any interest field, and the ontology includes an ontology schema and ontology instances.

The ontology instance means a real value or an entity that is matched with ontology classes, and the ontology classes mean a concept from among elements forming the ontology schema.

Furthermore, the instance means a real value or an entity that is matched with a class.

First, FIG. 1 is a diagram showing the construction of a semantic service application system according to the present invention.

As shown, the semantic service application system includes a semantic service server 100, service servers 200, and a semantic service pipeline providing server 300.

More particularly, the semantic service server 100 collects pieces of ontology-based semantic service information and ontology from the plurality of service servers, registers the pieces of ontology-based semantic service information and ontology, generates semantic service pipelines based on a plurality of semantic services according to a condition inputted by a user, and executes a specific semantic service pipeline.

Here, the plurality of service servers means the subjects from which the semantic services will be collected and generally means all servers, such as a server that provides a various portal services, a server that provides specific education data, and a server that provides search service.

Furthermore, the plurality of service servers may be identical with or different from reference numeral 200.

The semantic service pipeline providing server 300 requests the semantic service server 100 to execute a specific semantic service pipeline, receives a result of the execution, and determines whether to select the specific semantic service pipeline based on a result of the execution. If the specific semantic service pipeline is determined to be selected, the semantic service pipeline providing server 300 requests the relevant semantic service pipeline from the semantic service server 100 and receives and stores the relevant semantic service pipeline.

The service server 200 requests a specific semantic service pipeline from the semantic service pipeline providing server, receives the specific semantic service pipeline, and incorporates the received semantic service pipeline into its specific web frame or web page.

For example, the service server 200 applies a semantic service pipeline of a script language form, received from the semantic service pipeline providing server 300, to a web frame or web page and, when the relevant web frame or web page is selected by a user, calls and executes the Application Programming Interface (API) of the semantic service pipeline.

Figure 2:
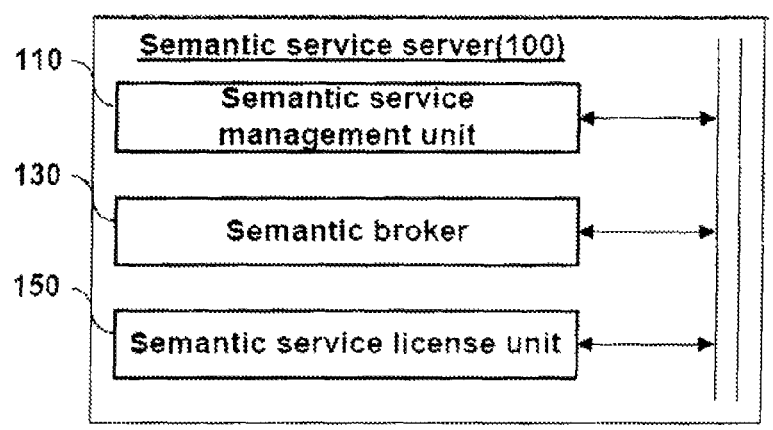
FIG. 2 is a diagram showing the construction of a semantic service server according to the present invention.

FIG. 2 is a diagram showing the construction of the semantic service server according to the present invention.

As shown, the semantic service server 100 includes a semantic service management unit 110, a semantic broker 130, and a semantic service license unit 150.

More particularly, the semantic service management unit 110 registers, deletes, and edits ontology-based semantic service information and ontology and supports information search performed by the semantic broker 130.

Here, the semantic service information includes a semantic service name, an input item, an output item, a property, a visualization type, reference ontology, and a service specification.

Furthermore, the semantic service management unit 110 further collects an ontology reference Application Programming Interface (API) and stores the collected ontology reference API in an additional repository.

If an ontology reference API does not exist, the semantic service management unit 110 stores relevant instance information itself.

The semantic broker 130 searches for semantic services through the semantic service management unit 110, combines the retrieved semantic services, and provides a result as any one of a combined semantic service or a semantic workflow.

When a user inputs a condition including an input factor according to preset items, the semantic service license unit 150 requests a result by transmitting the relevant condition to the semantic broker 130 and receives and outputs the relevant result.

More particularly, when the semantic service license unit 150 transmits the condition to the semantic broker 130, the semantic broker 120 generates a semantic service pipeline matched with the condition and transmits the generated semantic service pipeline to the semantic service license unit 150.

Furthermore, the semantic service license unit 150 requests the semantic broker 120 to execute a specific semantic service pipeline of a plurality of semantic service pipelines and receives a result of the execution.

The result of the execution of the semantic service pipeline is any one of a graph form, a group form, a grid form, a network form, a list form, a map form, a browsing form, a tag cloud form, and a tree form.

An example where the semantic service management unit 110, the semantic broker 130, and the semantic service license unit 150 disclosed in FIG. 2 are implemented on one server has been described, but they may be separately configured according to an intention of an operator.

Figure 3:
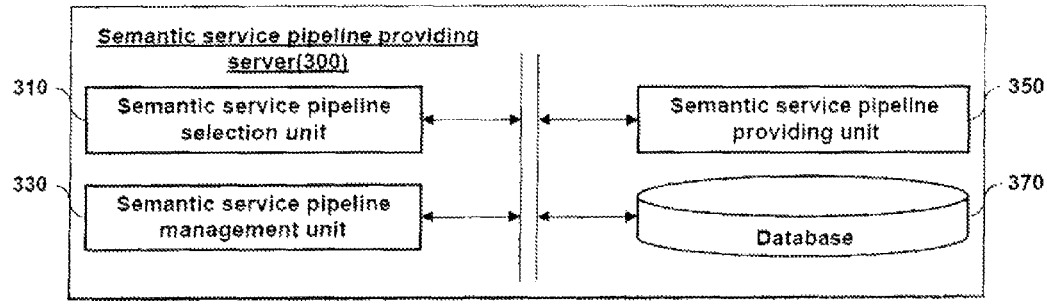
FIG. 3 is a diagram showing the construction of a semantic service pipeline providing server according to the present invention.

FIG. 3 is a diagram showing the construction of the semantic service pipeline providing server according to the present invention.

As shown, the semantic service pipeline providing server 300 includes a semantic service pipeline selection unit 310, a semantic service pipeline management unit 330, a semantic service pipeline providing unit 350, and a database 370.

More particularly, the semantic service pipeline selection unit 310 selects a specific semantic service pipeline to be managed by the semantic service pipeline providing server 300, from among a plurality of semantic service pipelines provided on the semantic service server 100.

Furthermore, the semantic service pipeline selection unit 310 requests the execution of a specific semantic service pipeline from among a plurality of semantic service pipelines provided on the semantic service server 100 and determines whether to select the specific semantic service pipeline based on a result of the execution received from the semantic service server 100.

In addition, the semantic service pipeline selection unit 310 requests a change of factors and the execution of a specific semantic service pipeline, from among a plurality of semantic service pipelines provided on the semantic service server 100, and determines whether to select the specific semantic service pipeline based on a result of the execution received from the semantic service server 100.

The semantic service pipeline management unit 330 requests a specific semantic service pipeline from the semantic service server 100, receives the specific semantic service pipeline, stores the specific semantic service pipeline in the database 370, and manages the specific semantic service pipeline.

When a user requests the semantic service pipeline providing unit 350 to provide one or more of a plurality of semantic service pipelines, the semantic service pipeline providing unit 350 extracts relevant semantic service pipelines from the database and transmits the extracted semantic service pipelines to the relevant service server 200.

The database 370 stores information associated with the semantic service pipeline providing server 300, including the semantic service pipelines.

Here, the semantic service pipeline stored in the database 370 has a script language form.

Figure 4:
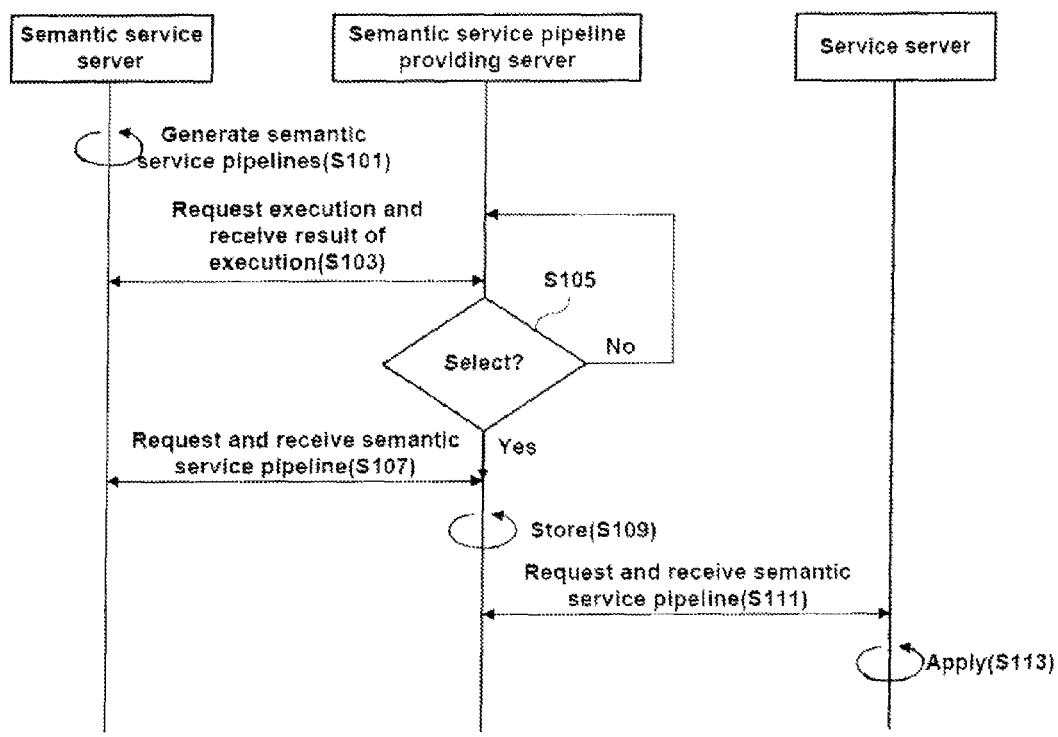
FIG. 4 is a flowchart illustrating an example of a semantic service application method according to the present invention.

FIG. 4 is a flowchart illustrating an example of a semantic service application method according to the present invention.

First, the semantic service server 100 collects pieces of ontology-based semantic services and ontology distributed among the plurality of service servers, registers the pieces of ontology-based semantic services and ontology, and generates semantic pipelines by combining one or more semantic services according to a specific condition (S101).

Next, the semantic service pipeline providing server 300 requests the execution of a specific semantic service pipeline, from among a plurality of semantic service pipelines provided on the semantic service server 100, and checks a result of the execution (S103).

The semantic service pipeline providing server 300 determines whether to select the specific semantic service pipeline to be managed by the semantic service pipeline providing server based on the result of the execution of the specific semantic service pipeline (S105).

If the specific semantic service pipeline is determined to be selected, the semantic service pipeline providing server 300 performs step S107.

The semantic service pipeline providing server 300 requests and stores the executed semantic service pipeline (S107, S109).

Here, the semantic service pipeline is stored in a script language form.

The service server 200 requests the specific semantic service pipeline from the semantic service pipeline providing server 300, receives the specific semantic service pipeline, and applies the received semantic service pipeline to its web frame or web page (S111, S113).

For example, the service server 200 applies a semantic service pipeline of a script language form, received from the semantic service pipeline providing server 300, to a web frame or web page so that the Application Programming Interface (API) of the applied semantic service pipeline is selected when a user selected the relevant web frame or web page.

Figure 5:
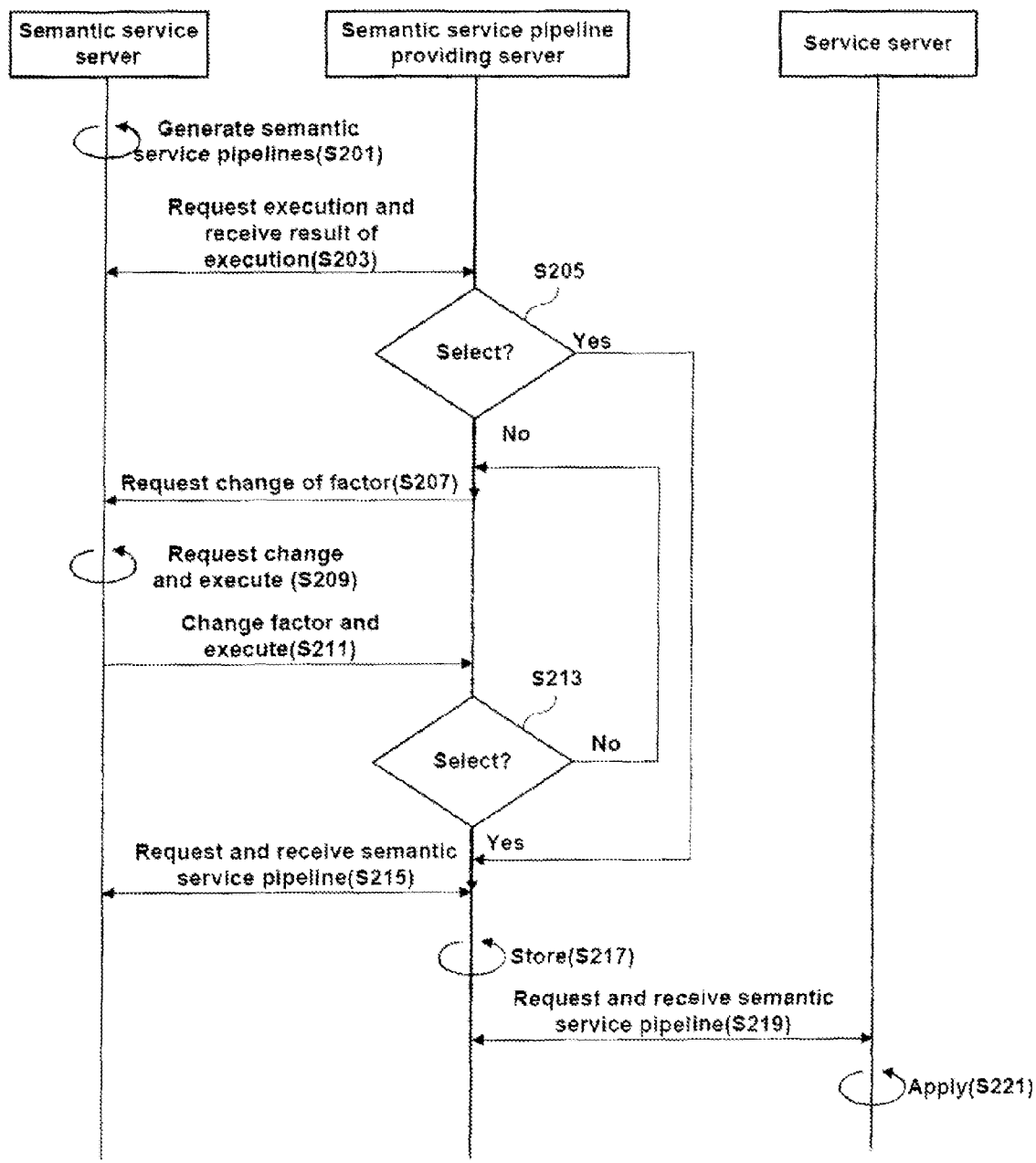
FIG. 5 is a flowchart illustrating another example of a semantic service application method according to the present invention.

FIG. 5 is a flowchart illustrating another example of a semantic service application method according to the present invention.

First, the semantic service server 100 collects pieces of ontology-based semantic services and ontology distributed among the plurality of service servers, registers the pieces of ontology-based semantic services and ontology, and generates semantic pipelines by combining one or more semantic services according to a specific condition (S201).

Next, the semantic service pipeline providing server 300 requests the execution of a specific semantic service pipeline, from among a plurality of semantic service pipelines provided on the semantic service server 100, and checks a result of the execution (S203).

The semantic service pipeline providing server 300 checks a result of the execution. If the semantic service pipeline needs to be changed, the semantic service pipeline providing server 300 requests factor of the semantic service pipeline to be changed and the semantic service pipeline to be executed (S205, S207).

This is performed when the result of the execution received from the semantic service server 100 is determined not to meet a selected criterion or a specific factor needs to be changed.

Next, the semantic service server 100 incorporates the factor, requested to be changed by the semantic service pipeline providing server 300, into the relevant semantic service pipeline, executes the relevant semantic service pipeline, and transmits a result of the execution to the semantic service pipeline providing server 300 (S209, S211).

The semantic service pipeline providing server 300 selects a specific semantic service pipeline to be managed by the semantic service pipeline providing server 300, based on the result of the execution of the semantic service pipeline (S213).

If the specific semantic service pipeline is selected, the semantic service pipeline providing server 300 performs step S215.

Meanwhile, if the result of the execution received from the semantic service server 100 does not meet a selected criterion or another specific factor needs to be changed, the semantic service pipeline providing server 300 performs step S207.

The semantic service pipeline providing server 300 requests the executed semantic service pipeline, receives the requested semantic service pipeline, and stores the received semantic service pipeline (S215, S217).

Here, the semantic service pipeline is stored in a script language form.

The service server 200 requests a specific semantic service pipeline from the semantic service pipeline providing server 300, receives the specific semantic service pipeline, and applies the received semantic service pipeline to its web frame or web page (S219, S221).

As described above, those having ordinary skill in the art to which the present invention pertains will appreciate that the present invention may be implemented in other detailed forms without changing the technical spirit or indispensable characteristics. Accordingly, it should be understood that the above embodiments are only illustrative from all aspects and are not to be restrictive. The scope of the present invention is defined by the following claims rather than the detailed description, and the meanings and scope of the claims and all changes or modified forms induced from their equivalents should be interpreted to fall within the scope of the present invention.

The invention claimed is:

1. A semantic service application system, comprising:
a semantic service server for collecting pieces of ontology-based semantic service information and ontology from a plurality of service servers, registering the pieces of ontology-based semantic service information and ontology, generating semantic service pipelines based on a plurality of semantic services according to a condition inputted by a user, and executing a specific semantic service pipeline;
a semantic service pipeline providing server for requesting the semantic service server to execute the specific semantic service pipeline, receiving a result of the execution, determining whether to select the specific semantic service pipeline, receiving the specific semantic service pipeline by requesting the specific semantic service pipeline from the semantic service server if the specific semantic service pipeline is determined to be selected, and storing the specific semantic service pipeline; and
a service server for receiving a specific semantic service pipeline by requesting the specific semantic service pipeline from the semantic service pipeline providing server and incorporating the received semantic service pipeline into its specific web frame or web page.

2. The semantic service application system according to claim 1, wherein the semantic service pipeline providing server comprises:
a semantic service pipeline management unit for receiving the specific semantic service pipeline by requesting the specific semantic service pipeline from the semantic service server, storing the received semantic service pipeline in a database, and managing the stored semantic service pipeline;
a semantic service pipeline providing unit for, when the user requests one or more of a plurality of the semantic service pipelines to be provided, extracting the relevant semantic service pipelines from the database, and transmitting the relevant semantic service pipelines to a relevant service server; and
the database for storing information associated with the semantic service pipeline providing server, including the semantic service pipelines.

3. The semantic service application system according to claim 2, wherein the semantic service pipeline providing server further comprises a semantic service pipeline selection unit for selecting the specific semantic service pipeline to be managed by the semantic service pipeline providing server, from among the plurality of semantic service pipelines provided on the semantic service server.

4. The semantic service application system according to claim 3, wherein the semantic service pipeline selection unit requests the specific semantic service pipeline, from among the plurality of semantic service pipelines provided on the semantic service server to be executed and determines whether to select the specific semantic service pipeline based on the result of the execution received from the semantic service server.

5. The semantic service application system according to claim 4, wherein the semantic service pipeline selection unit requests a change of a factor and an execution of the specific semantic service pipeline, from among the plurality of semantic service pipelines provided on the semantic service server, and determines whether to select the specific semantic service pipeline based on the result of the execution received from the semantic service server.

6. The semantic service application system according to claim 2, wherein the database stores the semantic service pipeline in a script language form.

7. A semantic service pipeline providing server coupled to a semantic service server and a plurality of service servers over a communication network and configured to provide semantic service pipelines, the semantic service pipeline providing server comprising:
a semantic service pipeline selection unit for selecting the specific semantic service pipeline to be managed by the semantic service pipeline providing server, from among the plurality of semantic service pipelines provided on the semantic service server;
a semantic service pipeline management unit for receiving a specific semantic service pipeline by requesting the specific semantic service pipeline from the semantic service server, storing the received semantic service pipeline in a database, and managing the stored semantic service pipeline;
a semantic service pipeline providing unit for, when a user requests one or more of a plurality of the semantic service pipelines to be provided, extracting the relevant semantic service pipelines from the database, and transmitting the relevant semantic service pipelines to a relevant service server; and
the database for storing information associated with the semantic service pipeline providing server, including the semantic service pipelines.

8. The semantic service pipeline providing server according to claim 7, wherein the semantic service pipeline selection unit requests the specific semantic service pipeline, from among the plurality of semantic service pipelines provided on the semantic service server to be executed and determines whether to select the specific semantic service pipeline based on a result of the execution received from the semantic service server.

9. The semantic service pipeline providing server according to claim 7, wherein the semantic service pipeline selection unit requests a change of a factor and an execution of the specific semantic service pipeline, from among the plurality of semantic service pipelines provided on the semantic service server, and determines whether to select the specific semantic service pipeline based on the result of the execution received from the semantic service server.

10. The semantic service pipeline providing server according to claim 7, wherein the database stores the semantic service pipelines in a script language form.

11. A semantic service application method of a semantic service application system, including a semantic service server, a semantic service pipeline providing server, and service servers, providing semantic services, the semantic service application method comprising the steps of:
   a) the semantic service server collecting pieces of ontology-based semantic services and ontology distributed among a plurality of the service servers, registering the pieces of ontology-based semantic services and ontology, and generating semantic pipelines by combining one or more of the semantic services according to a specific condition;
   b) the semantic service pipeline providing server requesting a specific semantic service pipeline, from among a plurality of semantic service pipelines provided on the semantic service server, to be executed and checking a result of the execution;
   c) the semantic service pipeline providing server selecting the specific semantic service pipeline to be managed by the semantic service pipeline providing server based on the result of the execution of the specific semantic service pipeline;
   d) the semantic service pipeline providing server receiving the executed semantic service pipeline by requesting the executed semantic service pipeline and storing the received semantic service pipeline; and
   e) the service server receiving a specific semantic service pipeline by requesting the specific semantic service pipeline from the semantic service pipeline providing server and applying the received semantic service pipeline to its web frame or web page.

12. The semantic service application method according to claim 11:
   wherein the step c) comprises the steps of:
   the semantic service pipeline providing server checking the result of the execution and requesting a change of a factor and an execution of the specific semantic service pipeline;
   the semantic service server incorporating the factor, requested to be changed by the semantic service pipeline providing server, into the specific semantic service pipeline, executing the specific semantic service pipeline, and transmitting a result of the execution to the semantic service pipeline providing server; and
   the semantic service pipeline providing server selecting the specific semantic service pipeline to be managed by the semantic service pipeline providing server based on the result of the execution of the specific semantic service pipeline.

13. The semantic service application method according to claim 11, wherein at the step d), the semantic service pipeline is stored in a script language form.

* * * * *